United States Patent Office 3,523,739
Patented Aug. 11, 1970

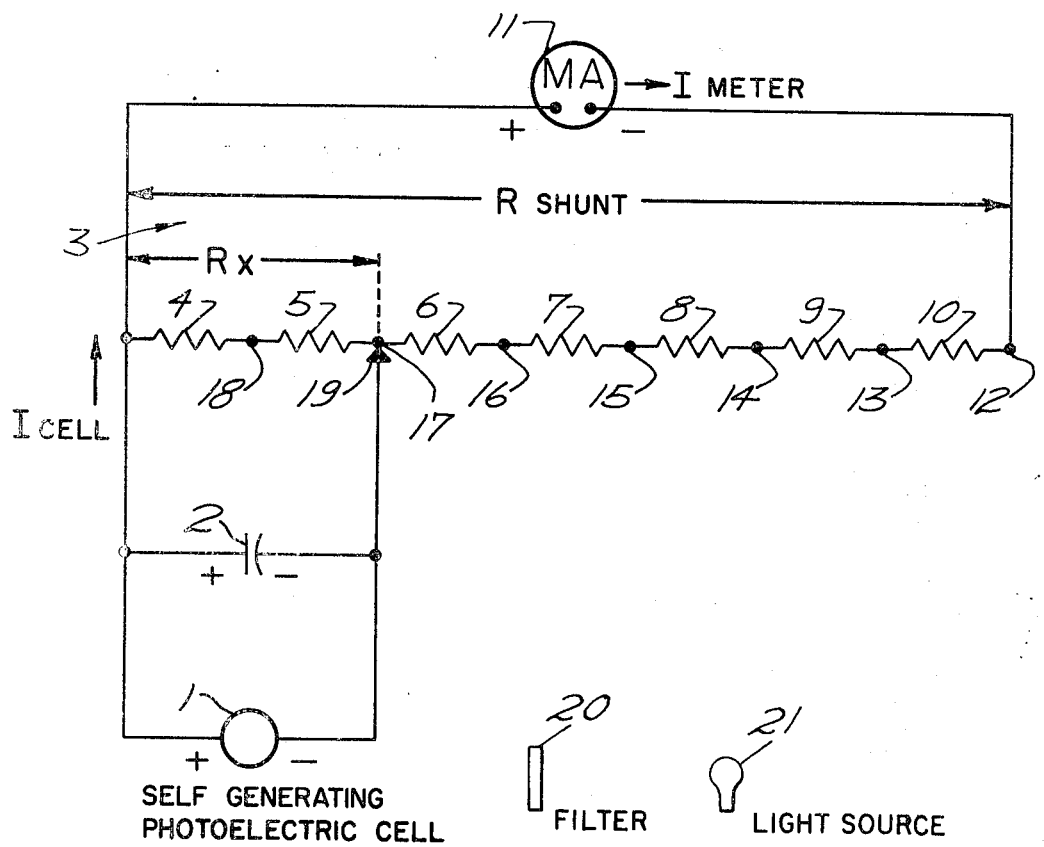

3,523,739
LIGHT METER FOR HIGH POWERED REPETITIVE LIGHT FLASHES
Louis L. Weisglass, New York, N.Y., assignor to Berkey Photo, Inc., New York, N.Y.
Filed Dec. 22, 1965, Ser. No. 515,652
Int. Cl. G01j 1/42, 1/46
U.S. Cl. 356—215    4 Claims

ABSTRACT OF THE DISCLOSURE

A light integrating meter for measurement of repetitive high powered light flashes of short duration incorporating a photocell having a characteristic such that the cell produces a current output proportionate to impinging light levels only with a low impedance load in which the light integrating meter includes a storage capacitor periodically charged by the photocell, the capacitor serving as a very low impedance loading device for the photocell, a metering circuit being provided discharging said capacitor and providing a metered indication proportionate to the average intensity of the light flashes.

---

The present invention relates to exposure meters and more particularly to integrating light meters for indicating the light output of high intensity lamps supplied by a peaked waveform alternating current.

Such high intensity lamps are of the gas discharge type usually having self heated thorated cathodes and may be filled with a suitable gas such as xenon, or a mixture of gases such as xenon and mercury. The lamps are operated from an alternating current line through an operating circuit which peaks the current supply to the lamps. In a sixty cycle alternating current line the sinusoidal current half wave has a length of about 8.3 milliseconds. By means of the operating circuit, the current wave to the discharge lamp is peaked so that the average length of the effective portion of each half wave is about 1.0 millisecond. Thus the lamp produces a series of high intensity flashes each of 1.0 milliseconds duration with a dark interval of about 7.3 milliseconds between flashes.

The light intensity of a single flash of a high power xenon light source is particularly high since its average intensity is produced by repetitive flashes each of approximately one millisecond duration. Consequently the light intensity of the pulse discharge lamp is approximately eight times the light intensity of the average light. Conventional barrier layer cells are incapable of producing high output currents corresponding to the light intensity of the pulse lamp with the cell still maintaining proportionality between cell current and light intensity.

An integrating light meter for indicating the light intensity of pulse lamps is used by placing the meter on an easel or other surface to which the pulse light is directed. The meter is moved around over the field of light to various locations as desired.

It is accordingly an object of the present invention to provide a light integrating meter incorporating a high output photoelectric device and circuit means for same so that meter readings are fully proportionate to the high intensity of the pulse lamp flashes.

Another object of the present invention is to provide a light integrating meter incorporating a photocell of extremely quick response with respect to the short time of the flash of the pulse lamp.

A further object of the present invention is the provision of a light integrating meter with adjustable scale ranges so as to be effective over a large range of light intensities and which indicates with full proportionality between reading and intensity of light over the entire sensitivity range of the meter.

A still further object of the present invention is to provide a light integrating meter which is responsive to short duration light flashes of high intensity.

An additional object of the present invention is to provide a self-contained, compact and rugged light integrating meter inexpensive in manufacture.

Other objects and advantages of the present invention will be apparent from the following description and from the accompanying drawing, which shows by way of example, an embodiment of the invention.

In the drawing there is shown a wiring diagram of a light integrating meter in accordance with the present invention.

Referring to the drawing there is shown a photocell 1 which is a self-generating silicon junction solar type cell. A capacitor 2 is directly connected across the terminals of the photocell 1 and provides a very low impedance loading device for the photocell 1. A metering circuit 3 for the capacitor 2 includes an Ayrton shunt formed of series connected resistors 4 through 10 inclusive, connected across the terminals of a microammeter 11. The resistors 4–10 are series connected through switch contacts 12–18 adapted to be switched by a contact arm 19. By switching the contact arm 19 a series of ranges are obtained varying from a direct reading at contact 12 through a reading to be multiplied by 2 at contact 13, by 5 at contact 14, by 10 at contact 15, by 20 at contact 16, by 50 at contact 17, to by 100 at contact 18. A suitable filter may be provided which passes only visible light and blocks the light produced in the infrared range. In order to further increase the range of the meter density filters may be used to reduce the light impinging on photocell 1. A filter of density I will increase the range from 100 to 1000.

In using the light integrating meter the photocell is placed in a desired location within the field of high intensity short duration flashes of light. A suitable filter may be placed over the photocell blocking all but visible light. This may be desirable since the cell has high sensitivity in the infrared region, the effect of which should not be incorporated in the light measurement. In the event the light intensity warrants, suitable neutral gray density filters may be placed over the photocell thereby increasing the usefulness of the high measuring ranges.

In an embodiment of the light integrating meter constructed and found to operate satisfactorily, the design criteria governing the choice of constants are as follows:

The photocell 1 is a self generating silicon junction solar type cell producing an open circuit voltage of between .3 and .4 volt. The cell delivers up to 30 milliwatts maximum power with a maximum current output of 75 milliamperes. The response time of the cell is less than 20 microseconds and the leakage resistance is of the order of 20,000 ohms. The diameter of the cell is about one inch.

A satisfactory meter was found to have a resistance of 935 ohms and a full scale deflection of 25 microamperes. The resistors had the following values: 4—20 ohms, 5—20 ohms, 6—60 ohms, 7—100 ohms, 8—200 ohms, 9—600 ohms, 10—1000 ohms. An electrolytic capacitor was used having a capacity of 400 microfarads..

From the foregoing circuit constants it will be noted that the resistance of the metering circuit selected with reference to the capacitor is such that the time constant of the discharge of the capacitor is equal to or more than the time between flashes. This may be calculated for the high level light range with contact arm 19 at contact 18 placing the 20 ohm resistor 4 directly in parallel with the capacitor 2.

Time constant$=CR=400 \times 20 \times 10^{-6}=8$ milliseconds (The meter resistance may be neglected.) The time between pulses at 60 cycles is 8.3 milliseconds and the light pulse length is about one millisecond, thus the discharge time between flashes is about 7.3 milliseconds and a time constant of 8 milliseconds is satisfactory.

Calculating for the low level or sensitive light range with the contact arm 19 at contact 12 the resistance of the shunt is 2000 ohms in parallel with the 935 ohm meter so that the resistance of the metering circuit is $$935 \times 2000/2935$$

or 634 ohms and the time constant is $400 \times 634 \times 10^{-6}$ or 254 milliseconds.

The current through the meter 11 using the Ayrton shunt may be calculated by using the following formula:

$$I_{meter} = \frac{I_c \times R_x}{R_{shunt} + R_{meter}}$$

In the above formula $I_c$ is the photocell current and $R_x$ is the resistance of the portion of the shunt in parallel with the meter setting of the contact arm 19.

In order to have a full deflection of the meter on the direct reading range, when contact arm 19 is directed to contact 12, the photocell 1 must produce an output current for 1 millisecond of .305 milliampere so as to provide a full scale meter current of 25 microamperes for the 8.3 milliseconds half cycle time between repetition of flashes. The heaviest output of the photocell is required when using the 100 times range when contact arm 19 is directed to contact 18. For this setting the photocell must produce an output current for 1 millisecond of 30.5 milliamperes in order to provide a full scale meter current of 25 microamperes for the 8.3 millisecond half cycle time.

Although it is obvious from the formula given above that the efficiency of the circuit increases with an increase in the resistance of the shunt, it is preferable in a commercial embodiment to use a readily available rugged meter of reasonable cost with a shunt of appropriate resistance values to match.

The cell 1 produces current only during the 1 millisecond period of the light flash. A self generating cell, such as the silicon junction type, can only produce high output currents if the cell delivers its energy into a vary low impedance device. Of course, the meter circuit is not a low impedance device. It has been therefore found necessary to provide a large capacitor in parallel with the cell which acts substantially as a short circuit for the cell during the light pulse. This capacitor discharges the stored energy during the time in between pulses through the metering circuit.

As can be seen from the foregoing, a meter for high energy pulsed light can only function properly if:

(1) A cell is used, capable of producing very high output current.
(2) The cell must have a quick response in the order of 20 microseconds.
(3) The output current is delivered into a very low impedance loading device as presented by a capacitor of large capacitance.

Another requirement of the silicon cell is that its reverse or leakage current must be relatively low. Otherwise the cell would draw current from the capacitor in between flashes, draining current away from the meter circuit so as to disturb the proportionality of the meter ranges. Therefore, a cell is used in which its leakage resistance is of the order of 20,000 ohms.

It is extremely important that the meter reads proportionately with a change in range. This is accomplished by selecting the capacitor loading for the photocell and the resistance values of the shunt and meter such that the cell operates in the linear portion of its output range.

From the preceding description it will be seen that an integrating light meter has been provided which is provided with a plurality of ranges covering light intensities varying from one to one hundred times. Satisfactory readings are obtained without appreciable variation in the proportionality between meter readings and light intensity. A further increase in range is obtainable to one thousand times by the use of a density filter 20 interposed between the photocell 1 and a light source 21. The light meter is fully responsive to high intensity light flashes of 1 millisecond in average length with a dark interval of 7.3 milliseconds such as occurs in use of pulsed xenon discharge lamps with a sixty cycle alternating current supply.

While the invention has been described and illustrated with reference to a specific embodiment thereof, it will be understood that other embodiments may be resorted to without departing from the invention. Therefore, the form of the invention set out above should be considered as illustrative and not as limiting the scope of the following claims.

I claim:
1. A light meter for measuring the average light produced by repetitive high powered light flashes of short duration in which the lengths of the flashes are of the order of a millisecond, the light meter comprising a self-generating photocell of the silicon junction type upon which the light is impinged, the photocell characteristic being such that the photocell produces a current output proportionate to impinging light only with a low impedance load, a storage capacitor connected in parallel with said photocell and charged by said photocell responsive to said flashes of light, the capacity of the capacitor being sufficiently high so that it represents a low loading impedance to the cell during the charge cycle, the capacity of the capacitor being such that the capacitor is charged to less than the open cell voltage of the photocell during the charge cycle, and a metering circuit discharging said capacitor, the metering circuit including a current averaging indicating device, a resistance shunt connected in parallel with said indicating device, circuit means adjustably connecting said metering circuit in parallel with said capacitor and photocell, the resistance of said metering circuit selected with reference to the capacity of the capacitor so that one time constant for the discharge of the capacitor is equal or greater than the time between light flashes.

2. A light meter according to claim 1 in which the photocell has a response time which is only a small fraction of the duration of the light pulse.

3. A light meter according to claim 1 in which the metering circuit includes a plurality of ranges, the metering circuit being of the Ayrton shunt type.

4. A light meter according to claim 1 in which an infrared absorbing or rejecting filter is provided passing only visible light to the photocell.

References Cited

UNITED STATES PATENTS

| | | | |
|---|---|---|---|
| 2,208,027 | 7/1940 | Gorlich | 356—215 |
| 3,147,680 | 9/1964 | Stimson | 356—219 |
| 3,344,703 | 10/1967 | Milton | 356—215 X |
| 3,351,493 | 11/1967 | Weiman et al. | 250—212 X |
| 585,257 | 6/1897 | Cox | 324—115 X |
| 685,954 | 11/1901 | Tesla. | |
| 2,232,373 | 2/1941 | Dorst. | |
| 2,452,614 | 11/1948 | Teetsell | 324—115 X |
| 2,478,966 | 8/1949 | Gilbert | 324—115 |
| 3,028,499 | 4/1962 | Farrall. | |
| 3,076,376 | 2/1963 | Kalmus. | |
| 3,080,790 | 3/1963 | Morgan. | |
| 3,144,600 | 8/1964 | Roberts | 324—115 X |
| 3,344,703 | 10/1967 | Milton. | |

FOREIGN PATENTS 1,036,999  4/1953  France.

OTHER REFERENCES

Edgerton et al., "Measuring Transient Light . . .," Electronics, Aug. 25, 1961, pp. 56–57.

Edgerton, "Light Meter for Electric Flash Lamps," Electronics, June 1948, pp. 78–81.

RONALD L. WIBERT, Primary Examiner

W. A. SKLAR, Assistant Examiner

U.S. Cl. X.R.

250—212; 324—115; 356—224